A. A. STEPHENS.
REAR AXLE MOUNTING FOR MOTOR VEHICLES.
APPLICATION FILED AUG. 2, 1919.
1,367,927.
Patented Feb. 8, 1921.
2 SHEETS—SHEET 2.
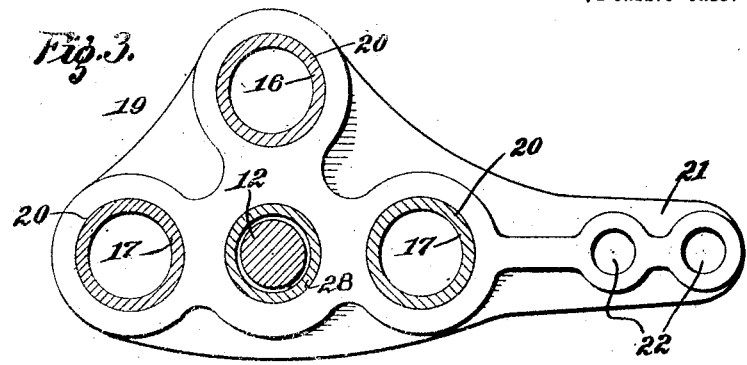
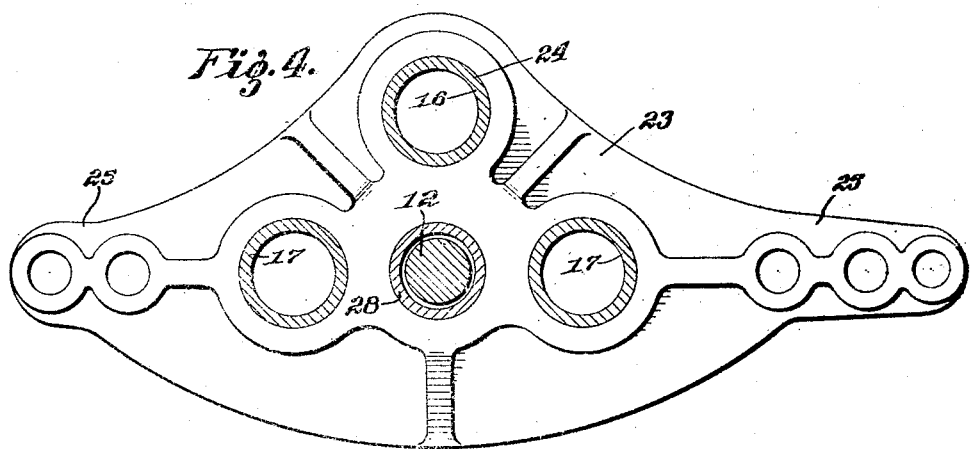
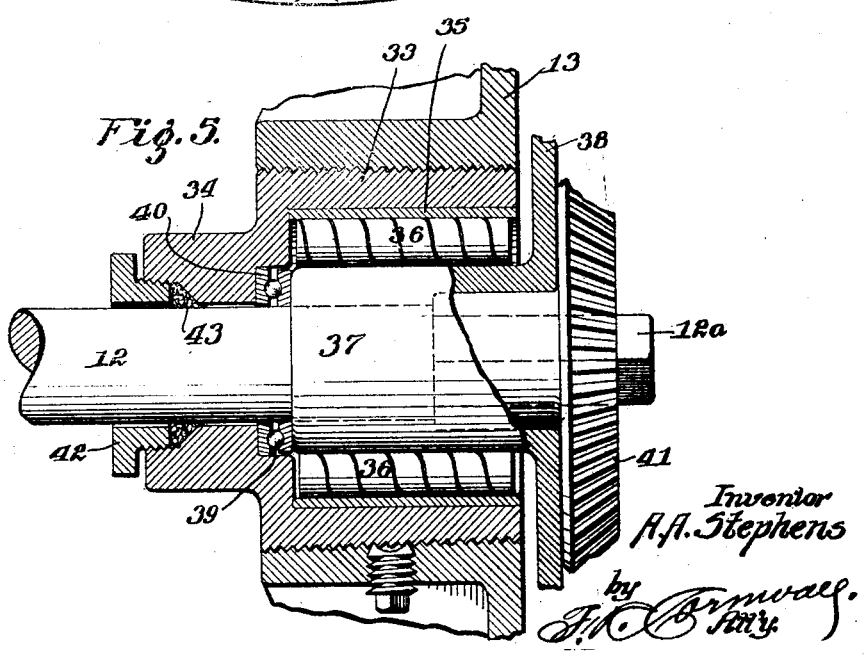

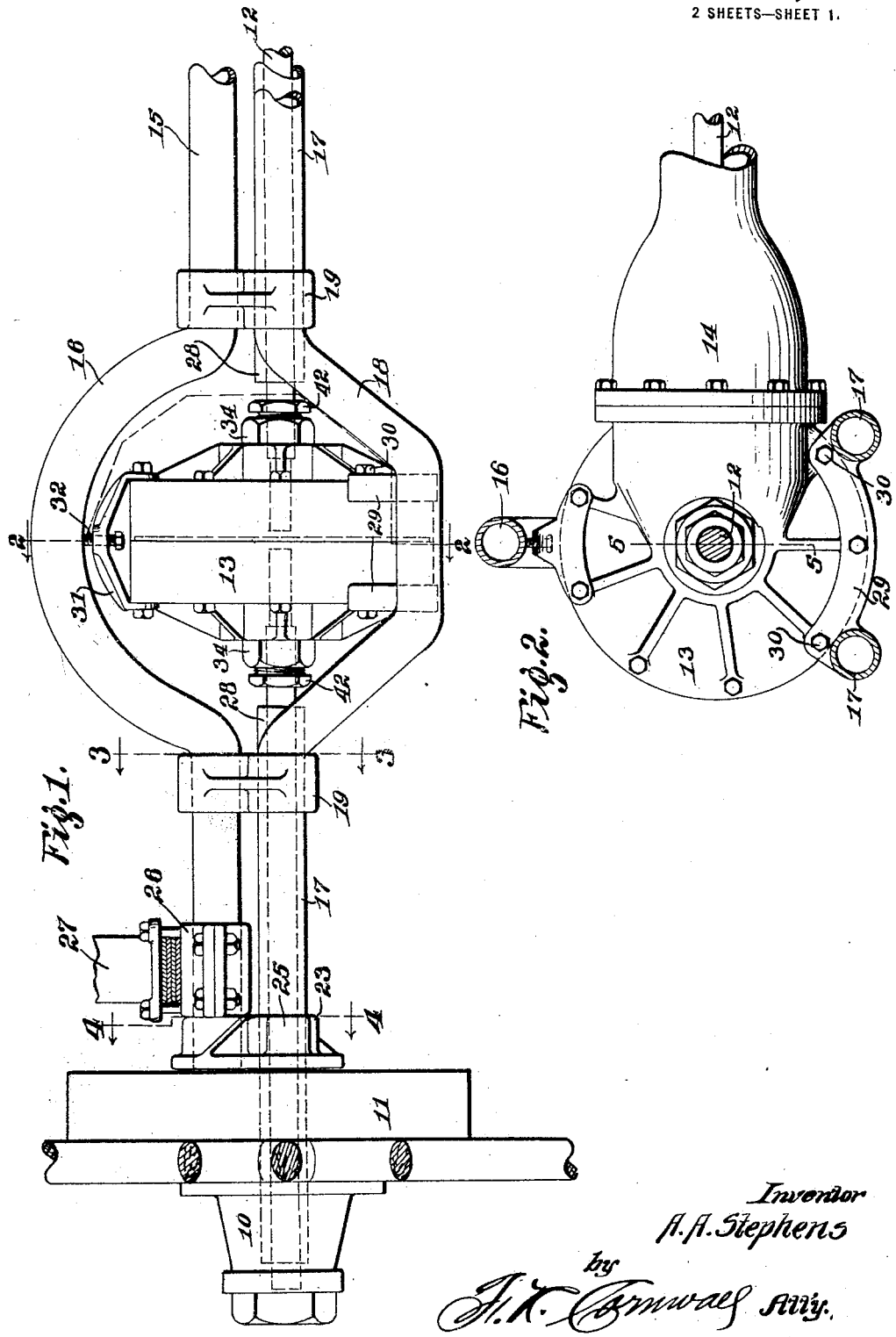

UNITED STATES PATENT OFFICE.

ARNOLD A. STEPHENS, OF DAVENPORT, IOWA, ASSIGNOR OF ONE-HALF TO DR. KARL VOLLMER, OF DAVENPORT, IOWA.

REAR-AXLE MOUNTING FOR MOTOR-VEHICLES.

1,367,927.        Specification of Letters Patent.        Patented Feb. 8, 1921.

Application filed August 2, 1919.   Serial No. 314,905.

*To all whom it may concern:*

Be it known that I, ARNOLD A. STEPHENS, a citizen of the United States, residing at Davenport, county of Scott, State of Iowa, have invented a certain new and useful Improvement in Rear-Axle Mountings for Motor-Vehicles, of which the following is a full, clear, and exact description, such as will enable others skilled in the art to which it appertains to make and use the same, reference being had to the accompanying drawings, forming part of this specification.

My invention relates generally to motor vehicle construction and more particularly to the supporting frame work for the rear axle of a vehicle and the differential gear housing associated with said rear axle.

The principal objects of my invention are to generally simplify and improve upon the existing types of rear axle supports and to provide a relatively simple supporting frame work which can be easily and cheaply manufactured, readily assembled or taken apart and the main members of which supporting frame work are of tubular construction, thereby providing a structure which combines great strength and rigidity with minimum weight.

Further objects of my invention are to provide a rear axle supporting frame work, the main members of which are of tubular construction and disposed in triangular arrangement so as to provide the required strength and rigidity; to provide a support which will firmly hold under all conditions the differential gear housing associated with the rear axle and at the same time permit the ready removal of said gear housing when certain retaining devices are released; to provide readily adjustable means for maintaining proper adjustment between the differential gear pinions and the planetary pinions associated therewith, and further to provide means for taking up the end thrust of the parts of the rear axle and prevent the leakage of oil from the differential gear housing outwardly along the parts of the axle.

With the foregoing and other objects in view, my invention consists in certain novel features of construction and arrangement of parts, hereinafter more fully described and claimed, and illustrated in the accompanying drawings, in which,—

Figure 1 is a rear elevational view of a rear axle and differential gear case support of my improved construction.

Fig. 2 is a vertical section taken approximately on the line 2—2 of Fig. 1.

Fig. 3 is an enlarged section taken approximately on the line 3—3 of Fig. 1.

Fig. 4 is an enlarged section taken approximately on the line 4—4 of Fig. 1.

Fig. 5 is an enlarged detail section taken approximately on the line 5—5 of Fig. 2.

Referring by numerals to the accompanying drawings, which illustrate a practical embodiment of my invention, 10 designates the hub of an ordinary motor vehicle, 11 the brake drum associated with said hub; 12 the rear axle, which latter it will be understood is made in two parts, the adjacent ends of which are connected by the usual differential gearing and the latter being contained within the usual gear case 13 with which is associated the drive shaft housing 14.

The axle and gear case supporting frame contemplated by my invention comprises a metal tube 15, the central portion of which is bent upwardly to form an arch 16 and the ends of this tube terminate adjacent to the vertical planes occupied by the inner edges of the brake drums 11.

The lower portion of the supporting frame work comprises a pair of load carrying tubes 17, the central portions of which are extended downwardly to form substantially U-shaped portions 18, the latter being disposed beneath the arched portion 16 of the upper tube 15, thus forming a space that is occupied by the differential gear case 13. The ends of these lower tubes 17 terminate adjacent to the brake drums 11 and said lower tubes are spaced apart a slight distance from each other and from the upper tube 15. This disposition of the tubes 15 and 17 provides a triangular arrangement of the main members of the supporting frame work and such arrangement is effective in producing a structure of great strength and rigidity and at the same time permitting the use of relatively light weight tubes.

The tubular members 15 and 17 are rigidly secured to each other at points immediately adjacent to the end of the arch 16 and the ends of the U-shaped portions 18 by plates or blocks 19, preferably of cast metal and provided with apertures 20 in which the tubes are snugly fitted.

Formed integral with or fixed to the tie plates 19 are forwardly extending brackets 21, the same being perforated as designated by 22 in order to receive parts of the brake mechanism associated with the vehicle. The outer ends of the tubular members 15 and 17 are connected by tie plates 23 preferably of cast metal and provided with openings 24 into which the ends of said tubular members are snugly fitted.

These end tie plates are provided with brackets 25 formed so as to provide bearings for parts of the brake rigging. Fixed in any suitable manner to the outer end portions of the upper tubular member 15 are blocks 26 which serve as supports and points of attachment for the usual springs 27.

Seated in each pair of tie plates 19 and 23 and disposed between the lower pair of tubes 17 is a tubular member 28 which serves as a housing for the corresponding part of the rear axle 12, said tubular housing extending into the wheel hub 10 and its inner end terminating slightly beyond the inner face of the inner tie plate 19.

As hereinbefore stated, the differential gear case 13 occupies the space between the arch 16 and U-shape portions 18 of the lower tubes 17 and when properly positioned, said gear case rests directly upon the centers of said U-shaped portions 18. To rigidly secure the gear case to the lower pair of tubes, the U-shaped portions 18 are connected by a transversely disposed pair of plates 29, the same being spaced apart a suitable distance and passing through these plates and bearing against the lower portion of the gear case 13 are bolts or screws 30. Secured to and positioned on top of the gear case 13 is an arched member 31 and passing upwardly through the central portion thereof is a set screw 32 which latter is adapted to impinge directly against the underside of the arched portion 16 of the upper tube and thereby firmly hold the gear case in proper position.

The means utilized in the sides of the gear case for making adjustments in the differential gearing and taking up all wear and lost motion therein is illustrated in Fig. 5, said means including a hollow cylindrical member 33 that is externally threaded in order that it may be screw seated in the side wall of the gear case. Formed integral with the outer portion of this member 33 is an extension 34, the periphery of which is provided with angular faces adapted to receive a wrench or like tool. Arranged within the cylindrical member 33 is a bushing 35 which serves as a bearing for ordinary anti-friction rollers 36, the latter bearing directly on the periphery of a hub 37 and which latter is formed integral with or fixed to the plate 38 that carries the ring gear of the differential. This hub 37 extends through the roller bearing chamber within the member 33 and its outer end engages directly against the inner member of a thrust bearing 39 which latter is positioned against an external shoulder 40 that is formed between the openings through extension 34 and the roller bearing chamber within member 33.

The inner end of the axle member 12 extends into the hub 37, the inner end of said axle member being made square or non-circular in cross section, as designated by $12^a$ and positioned thereupon is the usual differential pinion 41. Screw seated in a recess formed in the outer portion of extension 34 is a gland nut 42 and positioned within said member 34 below or at the inner end of this gland nut is a packing ring 43, preferably of felt and which, when the gland nut is tightened, fits snugly against the periphery of the axle section 12, thereby preventing leakage of oil outwardly from the gear case along said axle section.

It will be understood that an adjusting member 33, as described, is located in each side wall of the gear case and that by proper manipulation of either one or both of these adjusting members, the differential gearing may be properly adjusted and all lost motion due to wear, etc., taken up. When the gear case is properly positioned and secured to the central portions of tubular members 15 and 17, it is very firmly held and when it becomes necessary to remove the gear case for purposes of repair, the set screw 32 is withdrawn a short distance and after removing bolts or screws 30, and drawing the axle sections 12 outwardly a short distance, said gear case can be readily lifted from its position between the tubular members.

A rear axle supporting frame of my improved construction is comparatively simple, can be easily and cheaply manufactured, is light, strong and durable, permits the rear axle parts and the differential gearing and case associated therewith to be readily assembled or taken apart, provides for a ready adjustment of the gearing within the differential gear case and is very efficient in performing its intended functions.

It will be readily understood that minor changes in the size, form and construction of the various parts of my improved rear axle mounting for motor vehicles may be made and substituted for those herein shown and described, without departing from the spirit of my invention, the scope of which is set forth in the appended claims.

What I claim is:

1. In a rear axle mounting for motor vehicles, a pair of tubular members, the end portions of which are substantially parallel with each other, the central portions of which tubular members are extended downward for the accommodation of the differential gear housing associated with the rear axle, a third tubular member having its end portions disposed above and substantially parallel with the end portions of the first mentioned pair of tubular members, the central portion of the third tubular member being arched for the accommodation of the differential gear case, tubular members for the outer portions of the rear axle, which last mentioned tubular members are disposed between the substantially parallel end portions of the first mentioned pair of tubular members, and means for tying all of said tubular members to each other.

2. In a rear axle mounting for motor vehicles, a pair of tubular members, the end portions of which are substantially parallel with each other, the central portions of which tubular members are extended downward for the accommodation of the differential gear housing associated with the rear axle, a third tubular member having its end portions disposed above and substantially parallel with the end portions of the first mentioned pair of tubular members, the central portion of the third tubular member being arched for the accommodation of the differential gear case, spring supporting means on the end portions of said third tubular member, tubular members for the outer portions of the rear axle, which last mentioned tubular members are disposed between the substantially parallel end portions of the first mentioned pair of tubular members, and means for tying all of said tubular members to each other.

3. The combination with a motor vehicle rear axle and the differential gear and gear case associated therewith, of supporting means for said axle, gear and gear case, said supporting means comprising a pair of tubular members, the end portions of which occupy positions substantially parallel and in the same horizontal plane with the end portions of the axle, the central portions of which tubular members are extended downward to accommodate the differential gear case and a tubular member having its end portions disposed above and substantially parallel with the end portions of the axle, and the central portion of said upper tube being arched for the accommodation of the differential gear case.

4. The combination with a motor vehicle rear axle and the differential gear and gear case associated therewith, of supporting means for said axle, gear and gear case, said supporting means comprising a pair of tubular members, the end portions of which occupy positions substantially parallel and in the same horizontal plane with the end portions of the axle, the central portions of which tubular members are extended downward to accommodate the differential gear case, a tubular member having its end portions disposed above and substantially parallel with the end portions of the axle, the central portion of said upper tube being arched for the accommodation of the differential gear case, and means for tying said tubular members to each other.

5. The combination with a motor vehicle rear axle and the differential gear and gear case associated therewith, of supporting means for said axle, gear and gear case, said supporting means comprising a pair of tubular members, the end portions of which occupy positions substantially parallel and in the same horizontal plane with the end portions of the axle, the central portions of which tubular members are extended downward to accommodate the differential gear case, a tubular member having its end portions disposed above and substantially parallel with the end portions of the axle, the central portion of said upper tube being arched for the accommodation of the differential gear case, means for tying said tubular members to each other, and tubular members carried by said tying means for the outer portions of the rear axle.

6. A support for motor vehicle rear axles and the differential gearing and gear case associated therewith, comprising a pair of tubular members that are continuous from end to end, the end portions of said tubular members being spaced apart and occupying substantially the same horizontal plane, the central portions of said tubular members being extended downwardly and outwardly away from each other for the accommodation of the differential gear case, a third tubular member disposed above and between the first mentioned pair of tubular members, the end portions of said third tubular member lying substantially parallel with the end portions of said first mentioned pair of tubular members, and the central portion of said third tubular member being arched for the accommodation of the differential gear casing.

7. A support for motor vehicle rear axles and the differential gearing and gear case associated therewith comprising a pair of tubular members that are continuous from end to end, the end portions of said tubular members being spaced apart and occupying substantially the same horizontal plane, the central portions of said tubular members being extended downwardly and outwardly away from each other for the accommodation of the differential gear case, a third tubular member disposed above and between the first mentioned pair of tubular members, the end portions of said third tubular member lying substantially parallel with the end portions of said first mentioned pair of tubular members, the central portion of said third tubular member being arched for the accommodation of the differential gear casing, and tying means connecting the substantially parallel end portions of said tubular members.

8. A support for motor vehicle rear axles and the differential gearing and gear case associated therewith, comprising a pair of tubular members that are continuous from end to end, the end portions of said tubular members being spaced apart and occupying substantially the same horizontal plane, the central portions of said tubular members being extended downwardly and outwardly away from each other for the accommodation of the differential gear case, a third tubular member disposed above and between the first mentioned pair of tubular members, the end portions of said third tubular member lying substantially parallel with the end portions of said first mentioned pair of tubular members, the central portion of said third tubular member being arched for the accommodation of the differential gear casing, and tubular bearings arranged between the parallel end portions of the first mentioned tubular members for the end portions of the rear axle.

9. In combination with a motor vehicle rear axle and the differential gear and gear case associated therewith, supporting means for said axle, gear and gear case, said supporting means comprising a pair of members having end portions substantially parallel with the end portions of the axle and central portions extended downward to accommodate the differential gear case, a third member having end portions disposed substantially parallel with the end portions of the axle and a central portion arched for the accommodation of the differential gear case, a pair of oppositely disposed plates connected to the aforesaid pair of members and adapted to support the gear case, and a retractable securing member projecting from the gear case and adapted to impinge against the aforesaid third member.

In testimony whereof I hereunto affix my signature in the presence of two witnesses.

ARNOLD A. STEPHENS.

Witnesses:
 ABE LENENBOM,
 FRED ALGER.